United States Patent
Osborne et al.

(10) Patent No.: US 8,557,019 B2
(45) Date of Patent: Oct. 15, 2013

(54) PROCESS FOR PRODUCTION OF NICKEL AND COBALT USING METAL HYDROXIDE, METAL OXIDE AND/OR METAL CARBONATE

(75) Inventors: Geoffrey Edwin Osborne, Stoney Creek (CA); Ahmed Vahed, Oakville (CA); Samuel Walton Marcuson, Mississauga (CA); Wanda Agnieszka Baczkowska, Etobicoke (CA); Emmanuel Nii Tackie, Mississauga (CA)

(73) Assignee: Vale Inco Limited, Toronto (CA)

( * ) Notice: Subject to any disclaimer, the term of this patent is extended or adjusted under 35 U.S.C. 154(b) by 776 days.

(21) Appl. No.: 12/424,250

(22) Filed: Apr. 15, 2009

(65) Prior Publication Data

US 2009/0249921 A1    Oct. 8, 2009

Related U.S. Application Data (63) Continuation-in-part of application No. 12/366,768, filed on Feb. 6, 2009.

(60) Provisional application No. 61/027,058, filed on Feb. 8, 2008, provisional application No. 61/045,309, filed on Apr. 16, 2008, provisional application No. 61/045,311, filed on Apr. 16, 2008.

(51) Int. Cl.
  *C22B 1/16* (2006.01)
  *C22B 23/00* (2006.01)

(52) U.S. Cl.
  USPC .............................. 75/627; 75/629

(58) Field of Classification Search
  USPC ................................... 75/627, 629
  See application file for complete search history.

(56) References Cited

U.S. PATENT DOCUMENTS

| | | | |
|---|---|---|---|
| 3,769,002 A * | 10/1973 | O'Neill et al. | 75/627 |
| 3,791,816 A * | 2/1974 | Israel | 75/585 |
| 4,857,104 A * | 8/1989 | Victorovich et al. | 75/629 |
| 5,356,847 A * | 10/1994 | Henderson | 502/84 |
| 2002/0037455 A1 | 3/2002 | Tana et al. | |
| 2005/0020446 A1* | 1/2005 | Choudhary et al. | 502/407 |
| 2008/0039318 A1 | 2/2008 | Turaga et al. | |
| 2009/0208405 A1* | 8/2009 | Osborne et al. | 423/594.19 |

FOREIGN PATENT DOCUMENTS

| | | |
|---|---|---|
| JP | 2005-002395 | 1/2005 |
| KR | 0811872 B1 | 3/2008 |
| WO | WO 2006/089358 A1 | 8/2006 |
| WO | WO 2006089358 A1 * | 8/2006 |
| WO | WO 2008/022381 A1 | 2/2008 |
| WO | WO 2008/075879 A1 | 6/2008 |

* cited by examiner

*Primary Examiner* — George Wyszomierski
*Assistant Examiner* — Tima M McGuthry Banks
(74) *Attorney, Agent, or Firm* — Arent Fox LLP (57) ABSTRACT

A method for producing metal oxide from a metal salt selected from nickel hydroxide, cobalt hydroxide, mixed nickel-cobalt hydroxide, nickel carbonate, cobalt carbonate or mixed nickel-cobalt carbonate includes providing a mixture of the metal salt, mixing the metal salt with a binder selected from an inorganic binder or an organic binder, forming the mixture into agglomerates, and calcining the agglomerates to produce metal oxide. Another method for making metallic nickel or cobalt includes providing the above metal salt, mixing the metal salt with the above binder to form a mixture, optionally adding water, forming the mixture into agglomerates, drying the agglomerates, adding an effective reducing amount of coke and/or coal and directly reducing the dried agglomerates with an effective amount of heat to produce metallic nickel and/or cobalt. Coke particles may be added to the mixture prior to agglomeration.

34 Claims, 6 Drawing Sheets

PROCESS FOR PRODUCTION OF NICKEL AND COBALT USING METAL HYDROXIDE, METAL OXIDE AND/OR METAL CARBONATE

CROSS-REFERENCE TO RELATED APPLICATIONS

This application is a continuation-in-part of U.S. application Ser. No. 12/366,768 filed Feb. 6, 2009, and claims priority to U.S. Provisional Application No. 61/027,058 filed Feb. 8, 2008, and U.S. Provisional Application No. 61/045,309, filed Apr. 16, 2008 and U.S. Provisional Application No. 61/045,311, filed Apr. 16, 2008, the contents of each being incorporated herein by reference in their respective entireties.

BACKGROUND

1. Technical Field

Techniques for production of metallic nickel and cobalt.

2. Description of Related Art

Nickel and cobalt have traditionally been recovered from sulfide and oxide sources by both pyrometallurgical and hydrometallurgical techniques, with pyrometallurgical processing usually applied to the source feed (ore or concentrate) and hydrometallurgical methods employed for the final steps of metal refining. Trends over the last 10-15 years have witnessed increased application of hydrometallurgical technologies for direct treating of the source nickel/cobalt containing feeds. These would typically begin with an acid leach, followed by solution purification steps leading to the production of intermediates hydroxides, sulfides, carbonates), which would be further hydrometallurgically refined as required, or to the production of final metal products by electrowinning.

More recent developments have demonstrated the application of pyrometallurgical processes to refined hydrometallurgical solutions or intermediates for the production of the final product. Pyrometallurgical techniques typically involve drying, calcining/reduction and electric furnace smelting which produces ferro-nickel or nickel sulphide matte, which may be further processed to recover purified nickel. Pyrometallurgical techniques are usually applied to saprolite. Hydrometallurgical techniques are more typically applied to limonitic laterites. These techniques include the Caron process, high-pressure acid leaching (HPAL) with sulfuric acid at high temperature and high pressure, and atmospheric leaching, e.g., heap leaching with sulfuric acid at atmospheric temperature and pressure. Following leaching, the leachate is suitably neutralized to remove impurities such as Fe and Al, which is then followed by precipitation of a mixed Ni/Co intermediate, such as hydroxide, carbonate or sulphide, or the solution is subjected to solvent extraction or ion-exchange for the further removal of impurities (such as manganese) and/or the separation of nickel from cobalt. Nickel hydroxide may be produced from acidic nickel sulfate solutions produced as eluates, strip solutions, or raffinates from solvent extraction or ion exchange treatment. Nickel hydroxide may be subject to further processing and, e.g., be transformed into nickel oxide. Care must be taken in the handling of nickel oxide because nickel oxide powder is known to be hazardous.

WO 2006/089358 describes a process for the production of ferronickel from a mixed nickel iron hydroxide product which includes providing a mixed nickel iron hydroxide product; pelletizing the mixed nickel iron hydroxide product to produce nickel iron hydroxide pellets; calcining the nickel iron hydroxide pellets to produce mixed nickel iron oxide pellets; and reducing the nickel iron oxide pellets with one or more reducing gases at high temperatures to produce ferronickel pellets. As described therein, the mixed nickel iron hydroxide product would generally be in the form of a wet cake and to pelletize the mixed nickel iron hydroxide product, the wet cake is dried and pelletized with an organic binding material and water. Organic binding materials discussed therein are "a cellulose solution, starch or other viscous organic hydrocarbon polymers which are destroyed when temperatures exceed 500° C." The pelletized nickel iron hydroxide product is first dried at a temperature of about 100° C.-120° C. and then calcined at temperatures of about 800° C.-1300° C. under oxidizing conditions to convert the nickel iron hydroxide pellets to nickel iron oxide pellets substantially free of sulfur. At page 11, it is stated that the metals in the product from the furnace are mainly in the form of trevorite, a complex nickel iron oxide $NiFe_2O_4$ and the product is in the form of porous pellets. The porous pellets are not friable and no extraordinary measures are necessary to prevent formation of a hazardous powder. Use of bentonite as a binder in connection with production of iron is known. See also, WO 2008/022381 which is directed to production of metallic nickel with low iron content. The application does not disclose any techniques for controlling or eliminating the potential for hazardous nickel oxide powder.

SUMMARY

A method for making metal oxide is provided which includes providing a metal salt selected from the group consisting of nickel hydroxide, cobalt hydroxide, mixed nickel-cobalt hydroxide, nickel carbonate, cobalt carbonate and combinations thereof, mixing the metal salt with a binder selected from the group consisting of an inorganic binder, an organic binder and combinations thereof to form a mixture, optionally adding water, forming the mixture into agglomerates, drying the agglomerates, and calcining the dried agglomerates to produce nickel oxide and/or cobalt oxide. In embodiments, the metal oxide is reduced, e.g., using a gaseous reductant to produce metal.

Also provided is a method for making metallic nickel or cobalt which includes providing a metal salt selected from the group consisting of nickel hydroxide, cobalt hydroxide, mixed nickel-cobalt hydroxide, nickel carbonate, cobalt carbonate and combinations thereof, mixing the metal salt with a binder selected from the group consisting of an inorganic binder, an organic binder and combinations thereof to form a mixture, optionally adding water, forming the mixture into agglomerates, drying the agglomerates, adding an effective amount of coke and/or coal for reduction and directly reducing the dried agglomerates with an effective amount of heat to produce metallic nickel and/or cobalt.

Also provided is a method for making metallic nickel or cobalt which includes providing a metal salt selected from the group consisting of nickel hydroxide, cobalt hydroxide, mixed nickel-cobalt hydroxide, nickel carbonate, cobalt carbonate and combinations thereof, mixing the metal salt with a binder selected from the group consisting of an inorganic binder, an organic binder and combinations thereof, mixing the metal salt and binder with coke particles to form a mixture, optionally adding water, forming the mixture into agglomerates, drying the agglomerates, adding an effective amount of coke and/or coal for reduction to the agglomerates and directly reducing the dried agglomerates with an effective amount of heat to produce metallic nickel and/or cobalt.

Also provided is an agglomerate which includes a metal salt selected from the group consisting of nickel hydroxide, cobalt hydroxide, mixed nickel-cobalt hydroxide, nickel carbonate, cobalt carbonate, mixed nickel-cobalt carbonate and combinations thereof, and a binder selected from the group consisting of an inorganic binder, an organic binder and combinations thereof. In embodiments, the agglomerate may optionally contain coke.

DETAILED DESCRIPTION OF PREFERRED EMBODIMENTS

In embodiments, unfluxed agglomerates of nickel hydroxide, cobalt hydroxide, nickel oxide or cobalt oxide are produced according to the present disclosure that are well-suited for further processing into nickel or cobalt for use, e.g., in manufacturing stainless steel or superalloys. The metal oxide agglomerates produced herein are cohesive and of relatively low friability, thus avoiding finely pulverized metal oxide powders, which are known to be hazardous. The present disclosure allows production of nickel or cobalt metal from a semi-purified leach solution without extensive and costly refining and allows rejection of harmful impurities into the slag/gas and the recovery of nickel and/or cobalt into a byproduct stream. The processes herein are applicable to any semi-purified leach liquor containing nickel and/or cobalt, e.g., from laterite leachate, in which impurity metals detrimental to intended nickel or cobalt usage have been removed, e.g., Cu, Zn, Mn. In embodiments, the present process increases operating efficiencies associated with production of nickel or cobalt by incorporating addition of an inorganic binder and/or an organic binder at the agglomeration stage. The inorganic binder does not vaporize at high temperatures, thus contributing to prevention of hazardous dust generation during calcining and further processing. In embodiments, coke can be added at the agglomeration stage, followed by direct reduction of the metal hydroxide, thus simplifying operation and increasing efficiency of reduction-smelting or melting furnaces. As used herein, "pellets", "extrudates", briquettes, "granular" and "granules" are used interchangeably, notwithstanding the possibility that each may have a different shape, density and/or size. The term "agglomerates" is intended to encompass pellets, extrudates, briquettes, granular and granules, but not be limited thereto. The term "extrudate" is intended to encompass any product resulting from an extrusion process.

Flow charts depicting embodiments of processes according to the present disclosure are illustrated in FIGS. 1-5. In general, a metal salt product which can be nickel hydroxide product (NHP), cobalt hydroxide product (CHP) or both (MHP), nickel carbonate product (NCP), cobalt carbonate product (CCP), or both (MCP) in the form of a filter cake is at least partially dried and blended with a binder. The resulting mixture is then subjected to agglomeration and optionally dried. In embodiments, the agglomerate is calcined. See, e.g., FIGS. 1, 4 and 5. In embodiments, the result is unfluxed metal oxide, which can be subjected to further refining such as reduction (FIG. 1) and melting, or smelting (see, e.g., FIGS. 4 and 5 incorporating flux addition). The processes are described in more detail below. Unless otherwise specified, "metal salt" is intended to mean any or all of nickel hydroxide, cobalt hydroxide or both (MHP), nickel carbonate, cobalt carbonate, or both (MCP).

Any known leaching method or leach solution purification method may be used to provide metal salt for use in the present process as long as the metal salt does not contain impurities which are detrimental to the intended final use of the metal product. For example, NHP precipitate, CHP precipitate, NCP precipitate, CCP precipitate can be produced from laterite ore by various hydrometallurgical leaching processes. In one instance, a process for producing a purified nickel hydroxide precipitate starts with a nickel-containing leach solution having impurities including at least one of manganese, copper, zinc, iron and cobalt. The nickel-containing leach solution is treated, preferably under limited oxygen ingress conditions, at atmospheric pressure, with at least one base (such as, but not limited to, calcium oxide, calcium hydroxide, magnesium oxide) to form a slurry containing a mixed hydroxide precipitate and a low-nickel barren solution. The slurry is then thickened to form a mixed hydroxide precipitate filter cake, and the filter cake is washed to remove entrained barren solution. The washed mixed hydroxide filter cake is then contacted with acid (such as, but not limited to, sulfuric acid) to dissolve nickel and other metals contained in the filter cake to produce a concentrated nickel-containing solution of higher nickel concentration than was in the nickel-containing leach solution. The higher nickel concentration solution is then subjected to solvent extraction with an organic acid extractant to remove metals other than nickel from that nickel-containing solution, and form a solvent extraction raffinate of purified nickel solution. This purified nickel solution is then treated with a suitable base (such as, but not limited to, magnesium oxide) to form purified nickel hydroxide precipitate slurry. The nickel in the slurry is typically present as nickel hydroxide and basic nickel sulfate. The slurry is then thickened to form a nickel hydroxide precipitate filter cake, and the filter cake is washed to remove entrained barren solution. It should be understood that any method known to those with skill in the art may be used to provide metal salt for use in connection with the present disclosure.

NHP, CHP, NCP or CCP precipitate, no matter how produced, can be dried to a level that will allow for the addition of liquid binders without becoming too fluid. Alternatively, when blending the metal salt precipitate with dry additives, the precipitate should be sufficiently dried to become a free flowing powder suitable for dry powder blending. The choice of moisture level will depend on the method of agglomeration to be used. The precipitate may be pressure filtered or vacuum filtered to create a relatively low moisture cake and dried to become a free flowing powder, e.g., to a moisture content ranging from about 15% to about 30% by weight, about 18% to about 28% by weight, about 20% to about 25% by weight, or about 20% by weight. It is preferable to avoid hardening of the wet metal salt filter cake, which can be accomplished by promptly drying the precipitate after precipitation. Suitable temperatures for drying can range, e.g., from about 90° C. to about 120° C. After drying, the precipitate should be delumped or milled to create a maximum particle size, e.g., −10 mesh. In one embodiment, milling the precipitate to smaller than about 200 mesh in a hammer mill can facilitate pelletizing. Other size meshes can be utilized as well.

At this stage, a binder is added to the dried precipitate. Examples of inorganic powder binders are bentonite, quicklime, and sodium silicate. Inorganic binders, unlike organic binders do not burn off at high temperatures, thereby maintaining functionality. One or more of the foregoing binders may be blended with metal salt precipitate. Optional second inorganic or organic binders may be added which may be in powder or liquid form. Examples of powder binders are bentonite, lignin, guar gum and pregelatinized starch. Concentration of powder binders may range from about 2% to about 10% by weight metal salt (dry basis). For example, about 3% to about 6% of each powder binder alone or in combination. Organic binders include hydrolyzed starch, lignin, molasses, sugar, carboxymethylcellulose or cellulose is blended with the precipitate. These are relatively low temperature binders, which may be added at concentrations ranging from about 2% to about 10% by weight of the NHP, CHP, NCP or CCP (dry basis). A process utilizing an optional second binder such as guar gum, lignin, or hydrolyzed starch is depicted, e.g., in FIG. 4. It should be understood that addition of an optional second binder is not limited to the process illustrated in FIG. 4. Examples of intermediate temperature binders are glycerol triacetate or polyethylene glycol, which may be added at concentrations ranging from about 2% to about 5% by weight of the metal salt (dry basis). It is contemplated that the low temperature binders may be used alone or in combination with the intermediate temperature binders to a total concentration of about 15%, preferably 10% by weight of the metal salt (dry basis). Similarly, the intermediate temperature binders can be used alone or in combination with the low temperature binders. Concentration of aqueous solutions of binders may range from about 5 to about 80% dry binder in water. In another embodiment, a combination of binders in aqueous solution as described above is combined with dry powder binders to form a blend with metal salt precipitate. The binders are utilized to aid in agglomeration and provide adequate green strength to agglomerates or pellets formed from these blends.

The metal salt/binder mixture is formed into agglomerates, which may optionally be dried to develop sufficient strength for handling. In embodiments, agglomerates are dried and directly reduced to produce a metal product. Coke may be added to the metal salt/binder mixture prior to agglomeration in order to facilitate reducibility of the agglomerates. Coke particles ranging in size, e.g., from 200 mesh to about 100 mesh are suitable. In certain embodiments, coke particles of less than 200 mesh are preferred and can be obtained using a 200 mesh sieve. The amount of coke can range from about 2 wt % to about 10 wt %. Amounts greater than about 10 wt % may interfere with ability to form agglomerates. In embodiments, it may be advantageous to use a low sulfur metallurgical coke, e.g., about 0.9% sulfur to minimize the amount of sulfur in the agglomerates.

The agglomeration method depends on the desired size of the material, and can be selected from pelletizing, extrusion, micropelletizing, pin mixing, briquetting or spray drying. Water may be added to reduce the viscosity of the metal salt/binder (and optional coke) mixture prior to agglomeration to facilitate ease in handling. For example, a pasty consistency is desirable for extrusion. Those skilled in the art are capable of routinely determining sufficient amounts of water to form pastes of desired consistency. A paste can be used to create extrudates of any size, but thickness is, e.g., about 1 mm to about 8 mm. Thicker agglomerates may be more susceptible to thermal spalling and may require longer residence times. Notwithstanding that, thicker agglomerates, e.g., about 7 mm pellets up to about 20 mm may be used in accordance with the disclosure herein. If the selected method of agglomeration is pelletizing, the mixture can generally be left as a free-flowing powder until it is fed to a pelletizing device. While pellet size may have an impact on cold crushing strength (larger pellets can typically be stronger), it also can depend on other factors such as residence time on a pelletizing wheel. Differences in residence time for two similarly sized pellets can result in different densities, as pellets with a shorter residence time would be "fluffier" or more porous, while pellets with a longer residence time would be denser, compacted by weight of the pellets on the disc or wheel. Use of a pin mixer can produce irregularly shaped granules that may be handled with low dusting rates. The amount of moisture in the green agglomerates can be variable and may range, e.g., from about 20% to about 35% by weight. As mentioned above, the agglomerates may be dried to improve their strength and to remove free moisture prior to further processing to less than 5% moisture. Drying temperatures may range, e.g., from about 90° C. to about 120° C.

Figure 1:
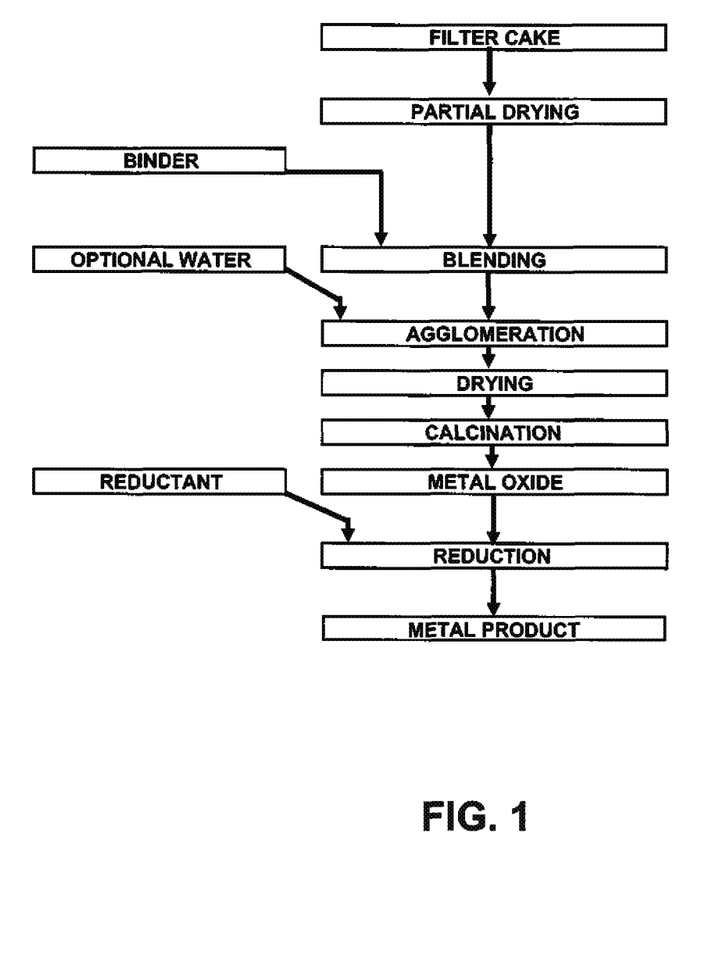
FIG. 1 is a flow chart of a process for producing metal product by forming and using metal oxide according to one embodiment of the present disclosure.
Figure 2:
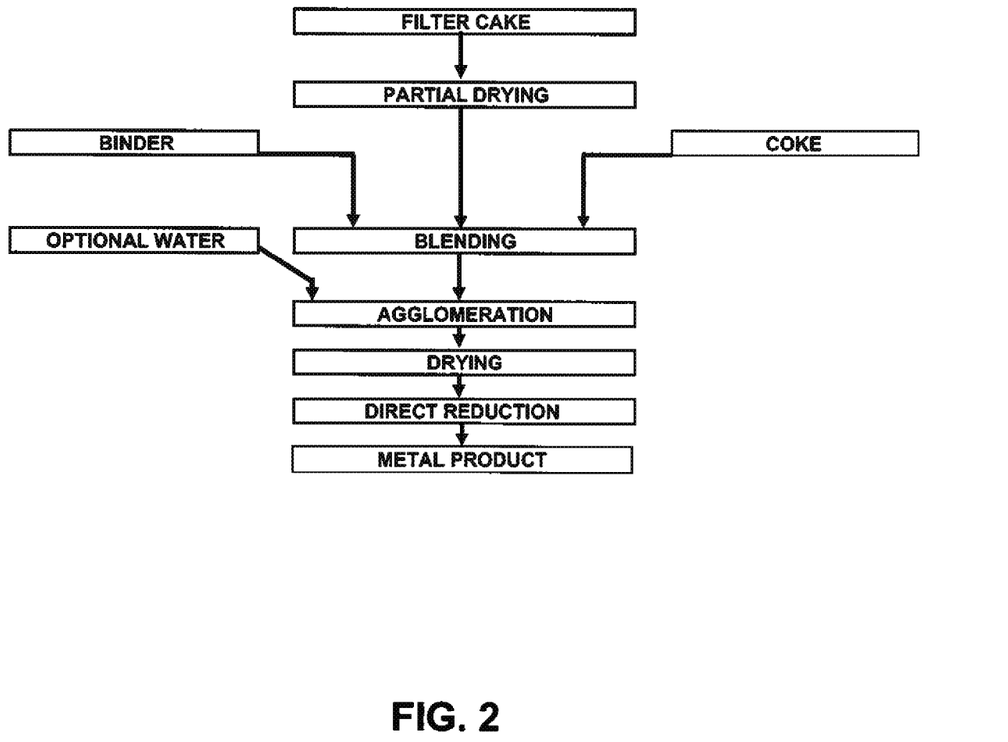
FIG. 2 is a flow chart of a process for producing metal by directly reducing a metal hydroxide according to another embodiment of the present disclosure.
Figure 3:
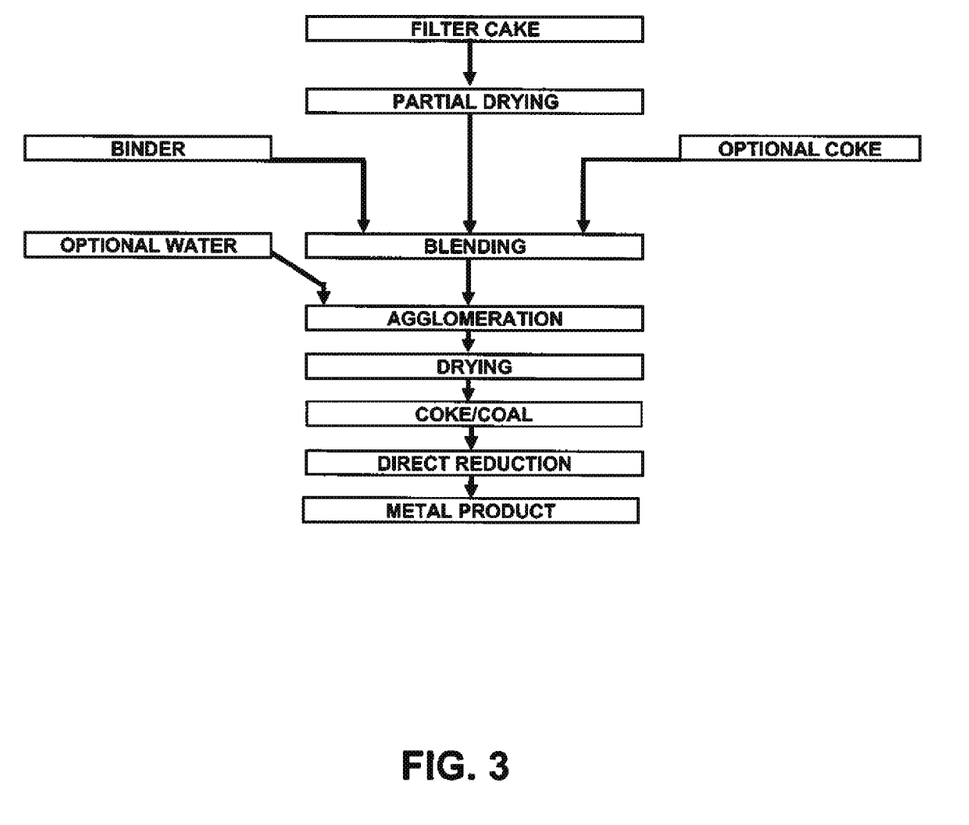
FIG. 3 is a flow chart of a process for producing metal by directly reducing metal hydroxide according to yet another embodiment of the present disclosure.
Figure 4:
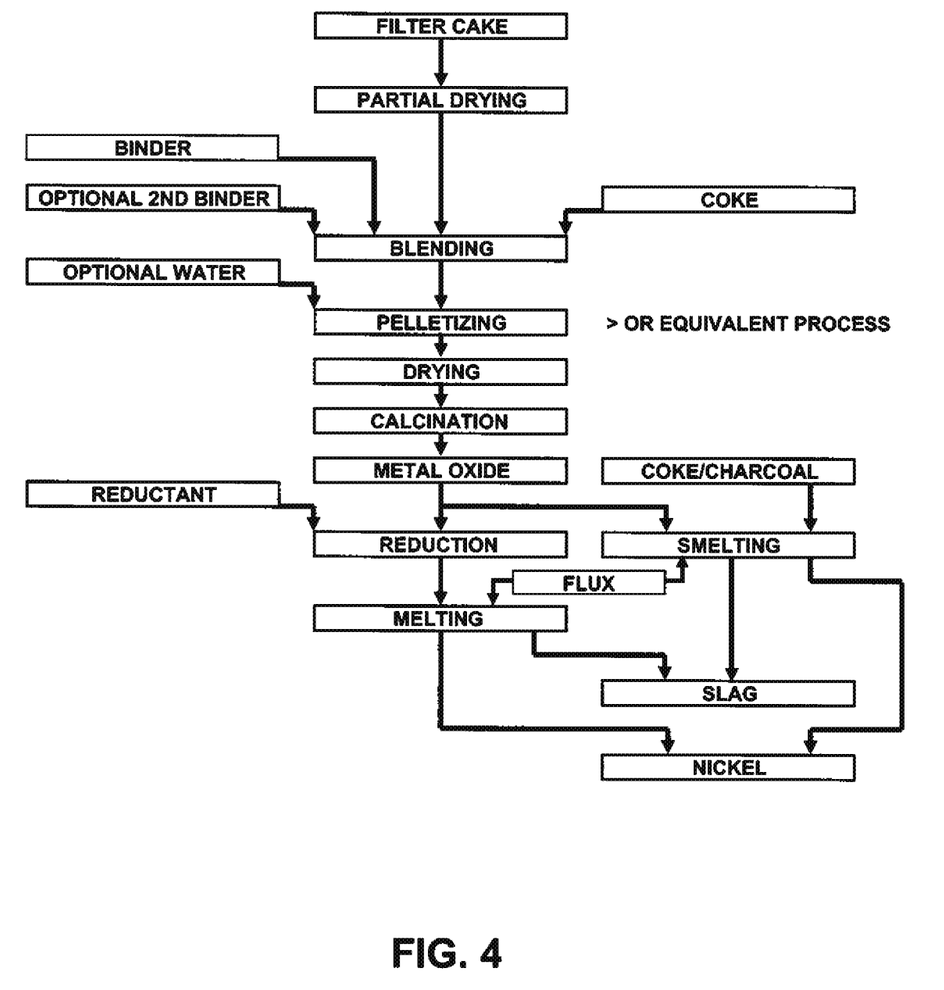
FIG. 4 is a flow chart of a process for producing metal by forming and using metal oxide according to yet another embodiment of the present disclosure.

Dried agglomerates may be subjected to direct reduction under coke cover as illustrated, e.g., in FIGS. 3 and 4. Commercial applications can involve a rotary hearth furnace or any similar hearth furnace. In cases where reduction follows calcination, optionally a shaft type furnace, such as a cupola or blast furnace, may be used to produce molten metal and slag with appropriate flux addition. In rotary hearth type furnaces, reducing temperatures may range from about 800° C. to about 1300° C., e.g., about 1200° C. The amount of coke may range from about 20% to about 60% by weight (dry basis) of pellets. For example, assuming that about 12.5% by weight coke is stoichiometric, then this corresponds to about 8 to 48% excess coke utilization. The dosage of coke addition depends on the efficiency of the coke reaction, which in turn depends on the method of application (mixture or layers) as well as the amount of oxygen present in the furnace atmosphere. Those skilled in the art are capable of determining suitable dosages based on conventional calculations. Complete coke cover helps facilitate full reduction. Agglomerates incorporating about 5% to about 10% coke may exhibit more uniform reducing characteristics due to the dispersed nature of the coke in the agglomerate. The agglomerates may be reduced in the furnace for a period of time ranging from about 15 minutes to about 90 minutes depending on the reductant selection, dosage and temperature. Agglomerates containing lesser amounts of sulfur and higher amounts of carbon are typically more uniformly reduced and produce extremely hard metallic nickel products, e.g., separate pellets. Agglomerates made from sources containing higher amounts of sulfur may especially benefit from coke incorporation. Lower temperatures, e.g., about 800° C. to about 1100° C. may also be utilized to avoid melting and sintering of such agglomerates.

In embodiments, the agglomerates are calcined in an oxidizing environment such as air to eliminate sulfur and then reduced, either under coke cover and/or by a gaseous reductant to produce metal product. In accordance with the present disclosure, a calcined agglomerate is produced with adequate strength without hazardous excessive dusting of metal oxide. In certain embodiments sulfur can be removed from the agglomerates for applications requiring low sulfur content. NHP or MHP precipitate contains some basic sulfate which can be thermally decomposed at temperatures over 800° C., e.g., about 1250° C. and removed under oxidizing conditions. A preferred calcining temperature is greater than about 1300°

C. and less than about 1500° C. Sulfur removal efficiencies of over 99.8% have been demonstrated, resulting in final assays of 0.005% sulfur after calcining at about 1380° C. to about 1400° C. In embodiments, the temperature may range from about 1350° C. to about 1400° C. for about 30 minutes. About 1390° C. to about 1400° C. has also been found to be suitable. Other combinations of temperature and time may be used, according to specific requirements to produce a calcined product with specific properties. Those skilled in the art are familiar with techniques to achieve these conditions. For example, green agglomerates are charged to a rotary hearth furnace (RHF) via an inclined chute for feeding. Mechanical shock combined with thermal shock may result in some breakage of the hearth layer of agglomerates. Accordingly, it is recommended, but not required, that vertical drop should not exceed 1 meter. In one embodiment using a RHF, the minimum temperature of the pellets on the hearth layer is about 1300° C. and the maximum temperature on the top surface of the bed is about 1450° C.-1460° C. In order to reach a temperature of about 1450° C. in the freeboard, the temperature can be set about 100° C. to about 150° C. higher, i.e., about 1550° C. to about 1600° C. It is advantageous to keep the calcining temperature as uniform as possible throughout the agglomerate. Any other suitable reactor may be used, e.g., a kiln, traveling grate, shaft furnace, multi-hearth furnace. Oxidizing conditions are provided by addition of air or other oxidizing gases within the reactor.

It should be understood that drying, prior to calcining, can be accomplished in a separate drier with subsequent transfer of the dried agglomerates into a calcining vessel for subsequent calcining. Alternatively, the agglomerates can be dried and calcined in the same vessel. The agglomerates can lose about 35% of their mass during calcining, primarily due to decomposition of hydroxides and sulfates. This translates into significant shrinkage in size of the agglomerates during calcining.

Figure 5:
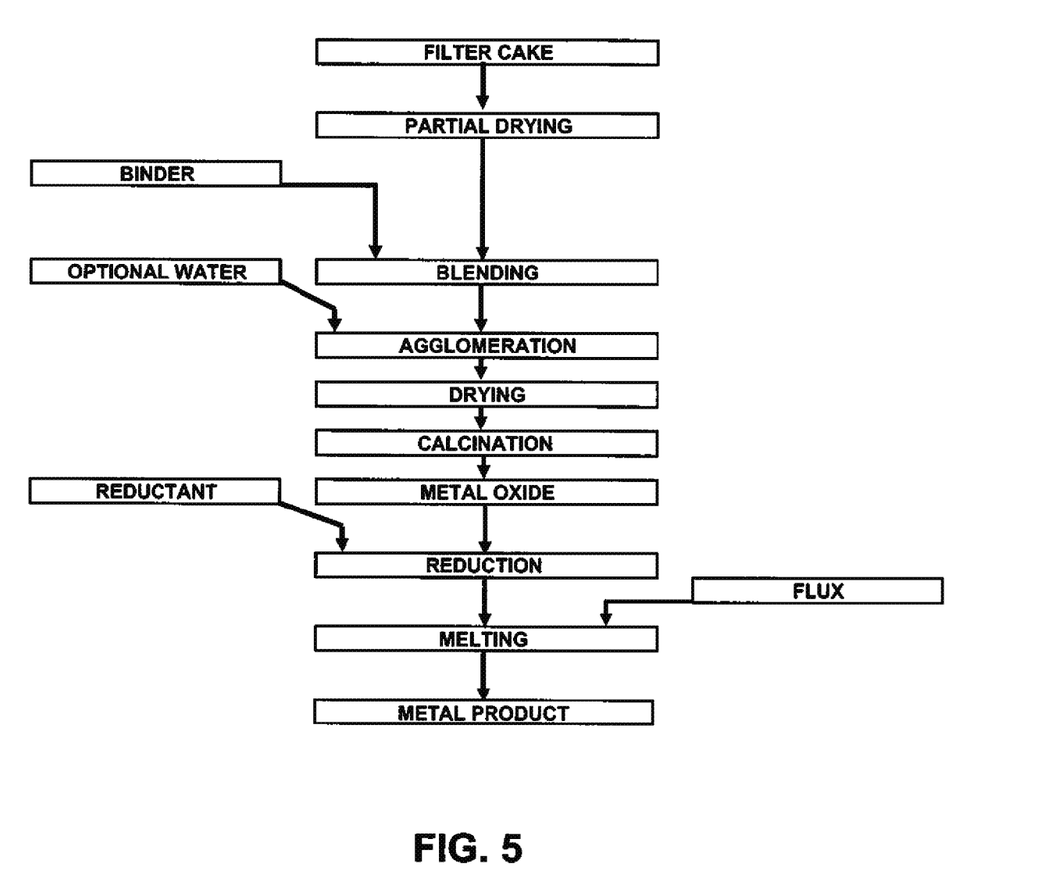
FIG. 5 is a flow chart of a process for producing metal by forming and using metal oxide and flux according to yet another embodiment of the present disclosure.

Metal oxide agglomerates produced according to the present disclosure are suitable for further processing. Care must be taken to prevent crumbling of the agglomerates after calcination since substantial cohesive strength is lost during calcination even with the inorganic binder. The calcined agglomerates consist of metal oxide, i.e., nickel oxide, cobalt oxide, and/or mixed nickel and cobalt oxide along with the inorganic binder. To make metallic nickel or cobalt, the metal oxide is reduced. This can be done either by reduction smelting in an electric furnace with a solid reductant such as coke and/or charcoal to produce molten nickel, or can be done in two stages by first reducing in the solid state using either solid or gaseous reductant and then melting the reduced agglomerates. Solid state reduction using a reducing gas at a temperature less than the melting point of the components in the agglomerates can be performed, and then followed by addition of flux along with simple smelting to separate the metal from the slag. As illustrated in FIGS. 4 and 5, flux can be added after reduction to provide a slag after melting for separation of certain impurities. Examples of gaseous reductants are hydrogen, carbon monoxide, mixtures thereof, and any gasified hydrocarbon fuel or gaseous fuel, e.g., methane. The reduction is advantageously carried out in the same vessel as calcination to minimize handling of the agglomerates, thus avoiding generation of metal oxide powder.

In embodiments, flux is added in a quantity sufficient to form a slag with slag-making oxides, which are present in the metal salt precipitate, e.g., MgO, CaO. For example, the flux can be a finely pulverized mixture of silica and lime, or other commercially available form thereof, which, in combining with slag-making oxides, forms a fluid slag. The flux mixture is selected to modify the slag composition to the zone in which the liquidus temperature is below, e.g., 1400° C. Flux addition should be tailored to create a slag with a liquidus temperature consistent with smelting operations. Thus, in one embodiment, addition of flux should preferably dissolve all the MgO present and provide a low solidus temperature, preferably about 1350° C. or less, which provides good slag bonding during melting of agglomerates. In one embodiment, flux addition is proportional to the Mg content of the precipitate feed and is sufficient to form a slag assaying about 10% to about 25% MgO by weight, and more preferably about 20% MgO by weight. In one embodiment, the flux is ground $SiO_2$/CaO to form a fluid slag in a ratio ranging from about 1.9 to about 2.2 parts $SiO_2$ to 1 part CaO. For example, about a 2:1 mass ratio. In another embodiment, ground $SiO_2$/$Al_2O_3$ flux in a ratio of from about 2 to about 2.5 parts $SiO_2$ to about 1 part $Al_2O_3$ may be used to form slag at, e.g., a 2.3:1 ratio in the MgO—$Al_2O_3$—$SiO_2$ system. The $SiO_2$—CaO—MgO slag system contains a region with liquidus temperatures between about 1350° C. and about 1400° C., which results in a fluid slag at the operating temperature of the smelting furnace. The $SiO_2$—$Al_2O_3$—MgO system also contains a similar region with a fluid slag at 1400-1450° C. Either slag system can be used. It should be understood that other fluxes, such as, but not limited to, ready made steelmaking slag or synthetic slag, that fulfill the same function or fluxes to suit a desired final slag composition can be utilized.

The following examples are illustrative of certain aspects of the present disclosure. Since they are merely exemplary, they should not be construed as limiting any broader and/or additional disclosure herein.

EXAMPLES

Mixed hydroxide product (MHP) and nickel hydroxide product (NHP) are generally received from pressure or vacuum filtration as filtercake with over 50% free moisture. Feed preparation prior to pelletizing involves drying the filtercake to less than 20% moisture (though any lower than 15% moisture will cause excessive dusting) followed by milling of the precipitate to less than 200 mesh (or 74 µm) in a hammer mil.

Two different sources of precipitate were used: NHP samples and MHP samples. Assays for both are shown in Table 1. The major differences between the two sources are the significantly higher impurity concentrations in MHP.

TABLE 1

| | Assay Results | | | | | | | | | | |
|---|---|---|---|---|---|---|---|---|---|---|---|
| | Ni | Co | Fe | CaO | $Al_2O_3$ | MgO | $SiO_2$ | S | Zn | Mn | C |
| NHP | 47.06 | 0.03 | 0.2 | 0.4-1.0 | 0.11 | 1.77 | 0.28 | 3.28 | 0.01 | 0.01 | 0.01 |
| MHP | 41.0 | 1.01 | 0.42 | 0.3 | 1.6 | 2.27 | 1.45 | 2.0 | 0.53 | 0.69 | 0-1.5 |

Figure 6:
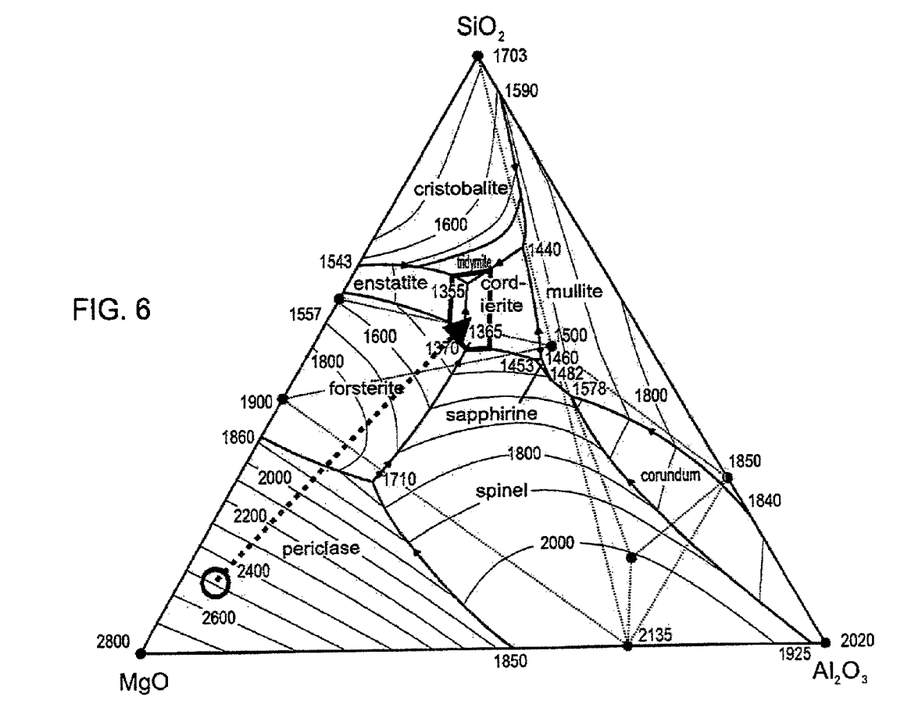
FIG. 6 is a graph depicting particle size distribution of dry milled nickel hydroxide powder.

NHP is a very fine chemical precipitate consisting of smooth and spherical particles, which makes it hard to agglomerate without the use of binders and/or pressure. A typical size distribution of dry, milled NHP is shown in FIG. 6. Binder mixture and addition was 3 wt. % each of bentonite and guar gum. Up to about 10 wt. % lignin and about 5 wt. % modified starch can be substituted for guar gum. Bentonite provides ballability at room temperature and facilitates bonding at higher temperatures as the $SiO_2$, CaO and $Al_2O_3$ components start to form low melting point phases around 1250° C. Pellets were also produced by incorporating varying amounts of coke in the pellets; 1, 2, 5 and 10% by weight, in order to optimize reducibility. Coke particles less than 200 mesh were used for pelletizing. Fine coke samples were screened using a 200 mesh sieve. Oversized particles were rejected while undersized particles were used for agglomeration.

Agglomerates were prepared on a 1250 mm diameter-pelletizing wheel. The milled precipitate was blended with the required binders and agglomerated in a pelletizing disc with only water addition sufficient to give green pellets containing 20-35% free moisture. The green pellets were then dried at 100° C. to less than 5% free moisture. Cold crushing pellet strength was tested using a Lloyd Universal Tester at a compressive rate of 0.5 mm/min; the average size and strength results are reported in Table 2.

TABLE 2

| Average Size, Strength and Density of Green Pellets. | | | |
|---|---|---|---|
| Description | Average Diameter (mm) | Force ($kg_f$) | Density ($g/cm^3$) |
| NHP w/3% guar & 3% bentonite, dried at 100° C. | 4.35 | 0.53 | 0.7 |

Only pellets between 4.0-5.6 mm were selected, with oversized and undersized pellets recycled back to the pelletizing wheel.

Direct Reduction

Small alumina crucibles, with dimensions 110 mm by 180 mm by 40 mm, were used. The unfluxed green pellets were weighed out, typically 200 g at a time, into the crucibles with varying amounts of metallurgical coke from about 20% to about 70% (by weight) distributed on top of the pellets. Several sources of both NHP and MHP precipitate were used for these tests with varying levels of impurities, as well as NHP pellets enhanced with coke (these will also be referred to as high carbon pellets). The crucibles were placed inside a pre-heated muffle furnace, at varying temperatures, i.e., 1000, 1050, 1100, 1200° C., in an oxidizing atmosphere. After a 30 minute residence time in the furnace, the crucibles were removed and placed on a lab bench to cool. The resulting pellets were analyzed for shrinkage, strength, the extent of sintering or melting and magnetic properties. An alternative layer distribution of coke and pellets was also tested for comparison. This involved scattering coke about 25% (by weight) on the crucible hearth, followed by a layer of pellets, then more coke on top. The best results obtained were with the MHP pellets under complete coke cover at 1200° C. All pellets in the crucible were uniformly reduced producing extremely hard nickel pellets, without sintering or melting. In comparison, the NHP pellets produced comparable results at all temperature except at 1200° C. SEM analysis showed that the MHP reduced very well, producing strong separate pellets, while the NHP resulted in a significant amount of fusing and sintering in the crucible, as well as the formation of a distinct glassy phase. Without wishing to be bound by any theory, the success of the MHP is likely due to the low sulfur concentration (thus less low melting point sulphide phase), and the considerably higher carbon content of this particular sample. Similar results were obtained with NHP samples containing 5% and 10% coke in the pellets at 1050° C. In cases where no coke was added to the pellets, there was some non-uniformity in the reduction. Top layer pellets were typically less reduced. In all samples, SEM analysis showed distinct metallic nickel, nickel sulphide and refractor oxides phases. It also confirmed that there was lower amount of nickel sulphide ($Ni_3S_2$) phase in the MHP samples compared with the NHP samples.

Larger scale tests were conducted using a direct-fired natural gas furnace in order to simulate the heat transfer conditions in a REF. The flame temperature was set to 1200° C. so that the freeboard temperature was maintained around 1050° C. The furnace atmosphere was adjusted so that it was oxidizing (about 110% aeration). Pellets were fed into a large cast alumina crucible (dimensions: 190 mm×248 mm×102 mm) at two bed depths; 13 mm and 25 mm. Different amounts of coke e.g., 50-60% by weight of pellets were then scattered overtop of the pellets and the crucible was rolled into the hot furnace. A thermocouple inserted through the crucible, resting on the hearth, was monitored to determine appropriate residence time for the pellets to reach the desired temperature and to ensure reactivity of the pellets. After 30-60 minutes in the furnace the crucible was rolled out and allowed to cool. During several of the tests, hot pellets were scraped from the hearth as soon as it was rolled out of the furnace to determine hot pellet strength and sintering characteristics.

These tests demonstrated that the direct reduction tests in the natural gas fired furnace were successful. It is possible to reduce unfluxed NiHP pellets containing 5% coke under a coke cover in a RHF simulating furnace, with good strength and NiO reduction results, for a 13 mm and 25 mm bed depth. The 13 mm bed only required a 30 minute residence time while the 25 mm bed required over 60 minutes. After reduction, assays showed that close to 50% of the nickel in the pellets was reduced; leaving about 15% nickel oxide (i.e. NiO) and 25% nickel sulphide (i.e. $Ni_3S_2$). The pellet compressive strength exceeded 3 $kg_f$, which is the minimum strength needed for handling and transportation. There were no issues with pellets sticking to the hearth or sintering together, even when discharged while still hot. Furthermore re-oxidation of the pellets, while cooling in air, was not found to be an issue.

Solid State Reduction of Calcined Pellets

Hydrogen gas was used initially as the reductant; however, later on several tests were conducted using coke cover for comparison. Both experimental procedures were similar. Green pellets were placed inside a small cylindrical or rectangular crucible and were calcined for 30 minutes in air at 1250° C. to drive off sulfur. Then, without removing the crucible, a stream of hydrogen was directed onto the pellets, effectively infiltrating the bed to reduce the calcined pellets at 1250° C., for 60 minutes. Alternatively, after calcinations, the material was covered with a layer of fine coke (about 25 to 45 wt % pellet feed) to cause reduction of the pellets.

The tests successfully demonstrated that oxidation followed by reduction in the same vessel without disturbing the pellets resulted in strong separate pellets. Table 3 shows product assay results for this reduction process from the above calcination test followed by reduction with hydrogen gas.

TABLE 3

| Assay, %: | |
|---|---|
| Cu | 0.008 |
| Ni | 88.43 |
| Co | 0.113 |
| Fe | 0.25 |
| CaO | 0.17 |
| $Al_2O_3$ | 1.08 |
| MgO | 4.98 |
| $SiO_2$ | 3.38 |
| ICP S | 0.07 |
| LECO S | 0.005 |
| Mn | 0.06 |
| As | <0.01 |
| Pb | <0.01 |
| Zn | <0.01 |
| Cr | <0.01 |
| C | <0.02 |
| P | <0.01 |
| TOTAL: | 98.5 |

The calcined and reduced pellets are sufficiently strong to withstand handling and shipping and have moderate abrasion resistance. The pellets consist of well-exposed sintered particles of nickel metal in a sponge-like structure, which makes them suitable for further purification, if desirable. Minor amounts of a slag phase were seen in SEM analysis as well as in the assay. The major source of the oxides is the residual impurities in NHP as well as the addition of bentonite. This reduction product is suitable to supply supplementary nickel units to existing commercial operations, or for direct marketing as feed to steelmaking operations.

Larger scale tests were conducted using a direct-fired natural gas furnace in order to simulate the heat transfer conditions in a RHF. The flame temperature was set to 1400° C. so that the freeboard temperature was maintained around 1250° C. The furnace atmosphere was adjusted so that it was oxidizing (about 110% aeration). Pellets were fed into a large cast alumina crucible (dimensions: 190 mm×248 mm×102 mm) at two bed depths; 25 mm and 50 mm. The crucible was rolled into the furnace for 30 minutes to first oxidize the pellets. A thermocouple inserted through the crucible, resting on the hearth, was monitored to determine appropriate residence time for the pellets to reach the desired temperature and to ensure reactivity of the pellets. The crucible was then rolled out, different amounts of coke, e.g., 20 to 30% by weight, were scattered overtop of the pellets and the crucible was rolled back into the hot furnace. After another 30 minutes in the furnace the crucible was rolled out and allowed to cool. During several of the tests hot pellets were scraped from the hearth as soon as it was rolled out of the furnace to determine hot pellet strength and sintering characteristics.

These solid-state reduction tests in the direct-fired natural gas furnace were very successful. It demonstrated that it is possible to calcine unfluxed NiHP pellets for 30 minutes in a RHF style furnace followed by reduction under coke cover, with good strength, sulphur removal and NiO reduction results, for both a 25 mm and 50 mm bed depth. The former only required a reduction residence time of 30 minutes (60 minutes total) at 1250° C. in the freeboard while the latter required at least 45 minutes for reduction (75 minutes total). After reduction, assays showed that close to 80% of the nickel in the pellets was reduced; leaving only 9% NiO and 0.3% sulphur. The pellet compressive strength exceeded 3 $kg_f$, which is the minimum strength needed for handling and transportation. There were no issues with pellets sticking to the hearth or sintering together, even when discharged while still hot. Furthermore re-oxidation of the pellets, while cooling in air, was not found to be an issue.

Calcination of Cobalt and Nickel Carbonate

In one case, a mix of pelletized cobalt carbonate, 3% by weight bentonite, 3% by weight guar gum, having an average diameter of 7 mm was calcined at 1250° C. for 30 minutes. In another case, a mix of pelletized nickel carbonate, 3% by weight bentonite, 3% by weight guar gum, having an average diameter of 7 mm was calcined at 1250° C. for 30 minutes. Assay results on samples are shown in Table 4 below.

TABLE 4

| | | | Cobalt carbonate | | | | Nickel carbonate | | |
|---|---|---|---|---|---|---|---|---|---|
| Test Number | | CoCarb-1 | | | | NiCarb-1 | | | |
| Binder name | | | bent + guar | | | | bent + guar | | |
| Binder quantity | Wt % on NHP | | 3 + 3 | | | | 3 + 3 | | |
| Peak temperature | ° C. | | | 1250 | 1550 | | | | 1250 |
| Dwell at peak temperature | h | | | 1 | | | | | 1 |
| Atmosphere | | | | $H_2$/CO | air (melted) | | | | $H_2$/CO |
| | Assays, % | AS-REC'D | GREEN | OX-RED | METAL | AS-REC'D | GREEN | OX-RED | |
| | Cu | 0.022 | 0.016 | 0.032 | 0.04 | 0.002 | 0.003 | 0.006 | |
| | Ni | 0.129 | 0.153 | 0.281 | 0.313 | 50.01 | 49.67 | 91.34 | |
| | Co | 48.13 | 46.59 | 92.74 | 98.38 | 0.041 | 0.053 | 0.164 | |
| | Fe | 0.63 | 0.71 | 1.38 | 0.74 | 0.02 | 0.20 | 0.19 | |
| | CaO | 0.2 | 0.11 | 0.22 | 0.38 | <0.07 | 0.08 | <0.07 | |
| | $Al_2O_3$ | <0.02 | 0.53 | 1.06 | <0.02 | 0.08 | 0.66 | 1.19 | |
| | MgO | 0.02 | 0.13 | 0.20 | <0.02 | <0.02 | 0.08 | 0.13 | |
| | Si | | | | | | | | |
| | $SiO_2$ | 0.17 | 1.75 | 3.51 | 0.15 | 0.09 | 2.14 | 4.26 | |
| | LECO S | | 0.22 | <0.01 | <0.01 | 0.27 | 0.22 | <0.01 | |
| | Mn | 0.01 | 0.01 | 0.03 | <0.01 | <0.01 | <0.01 | <0.01 | |
| | As | <0.01 | <0.01 | <0.01 | <0.01 | <0.01 | <0.01 | <0.01 | |
| | Pb | <0.01 | <0.01 | <0.01 | <0.01 | <0.01 | <0.01 | 0.02 | |

TABLE 4-continued

| | | | | | | | |
|---|---|---|---|---|---|---|---|
| Zn | <0.01 | <0.01 | <0.01 | <0.01 | <0.01 | <0.01 | <0.01 |
| Cr | 0.15 | 0.13 | 0.27 | <0.01 | <0.01 | <0.01 | <0.01 |
| Na | 1.24 | 1.17 | 0.57 | | 0.002 | | |
| C | | 6.50 | 0.07 | <0.02 | 4.22 | 5.56 | <0.005 |
| O | | 42.4 | 2.94 | 0.02 | 46.2 | 41.5 | 2.14 |
| P | | 0.01 | <0.01 | <0.01 | <0.01 | 0.02 | <0.01 |
| TOTAL: | | | 100.36 | 100° | | | 97.30 |

* Co in metal by difference

The present process allows metal salts to be transformed directly into metallic product or into a granular, unfluxed metal oxide that is suitable for electric furnace smelting, or other suitable smelting vessel, to produce, e.g., nickel metal for the production of stainless steels. This pyrometallurgical approach to treat metal salt is potentially more cost effective and considerably simpler than traditional hydrometallurgical refining routes to provide nickel directly to the stainless steel industry.

While in accordance with the provisions of the statute, there are illustrated and described herein specific embodiments of the disclosure, those skilled in the art will understand that changes may be made in the form of the disclosure covered by the claims and that certain features of the disclosure may sometimes be used to advantage without a corresponding use of the other features. For example, the concentrations, temperature, time, flow, may be varied by those skilled in the art in accordance with conventional wisdom.

The embodiments of the invention in which an exclusive property or privilege is claimed are defined as follows:

1. A method for making metallic nickel or cobalt comprising:
   providing a metal salt selected from the group consisting of nickel hydroxide, cobalt hydroxide, mixed nickel-cobalt hydroxide, nickel carbonate, cobalt carbonate, mixed nickel-cobalt carbonate and combinations thereof;
   blending the metal salt with a binder selected from the group consisting of inorganic binder and combinations of inorganic and organic binders, to form a mixture;
   forming the mixture into agglomerates;
   drying the agglomerates;
   calcining the dried agglomerates to produce a metal oxide selected from the group consisting of nickel oxide, cobalt oxide and combinations thereof;
   adding coke to the mixture; and
   reducing the metal oxide to produce a metal selected from the group consisting of nickel, cobalt and combinations thereof.

2. The method for making metallic nickel or cobalt according to claim 1 further comprising adding water to the mixture.

3. The method for making metallic nickel or cobalt according to claim 1, wherein the inorganic binder is selected from the group consisting of bentonite, quicklime, sodium silicate and combinations thereof.

4. The method for making metallic nickel or cobalt according to claim 1 wherein the organic binder is selected from the group consisting of lignin, guar gum, molasses, sugar, carboxymethylcellulose, cellulose, glycerol triacetate, polyethylene glycol, hydrolyzed starch, pregelatinized starch and combinations thereof.

5. The method for making metallic nickel or cobalt to claim 1, wherein the binder is present in an amount ranging from about 2% to about 10% by weight.

6. The method for making metallic nickel or cobalt according to claim 1, wherein the metal oxide is reduced by a gaseous reductant.

7. The method for making metallic nickel or cobalt according to claim 1, wherein the metal oxide is reduced by coke or charcoal.

8. The method for making metallic nickel or cobalt according to claim 1, further comprising adding flux to the metal, melting or smelting, and separating slag from the metal.

9. The method for making metallic nickel or cobalt according to claim 1, wherein the agglomerates are dried at a temperature ranging from about 90° C. to about 110° C.

10. The method for making metallic nickel or cobalt according to claim 1, wherein the agglomerates are calcined at a temperature ranging from about 1300° C. to about 1500° C.

11. The method for making metallic nickel or cobalt according to claim 1, wherein the agglomerates are selected from the group consisting of pellets, briquettes, granules and extrudates.

12. The method of making metallic nickel or cobalt according to claim 1, further comprising at least partially drying the metal salt prior to blending the metal salt with the inorganic binder.

13. The method of making metallic nickel or cobalt according to claim 1, wherein the agglomerates are dried and calcined in one vessel.

14. A method for making metallic nickel or cobalt comprising:
   providing a metal salt selected from the group consisting of nickel hydroxide, cobalt hydroxide, mixed nickel-cobalt hydroxide, nickel carbonate, cobalt carbonate and combinations thereof;
   mixing the metal salt with a binder selected from the group consisting of inorganic binder and combinations of inorganic and organic binders, to form a mixture;
   optionally adding water;
   forming the mixture into agglomerates;
   drying the agglomerates;
   adding an effective reducing amount of a reducing agent selected from the group consisting of a gaseous reductant, coke, charcoal and combinations thereof;
   adding coke to the mixture; and
   directly reducing the dried agglomerates with an effective amount of heat to produce a metal selected from the group consisting of nickel, cobalt and combinations thereof.

15. The method for making metallic nickel or cobalt according to claim 14 wherein the inorganic binder is selected from the group consisting of bentonite, quicklime, sodium silicate and combinations thereof.

16. The method for making metallic nickel or cobalt according to claim 14 wherein the organic binder is selected from the group consisting of lignin, guar gum, molasses, sugar, carboxymethylcellulose, cellulose, glycerol triacetate, polyethylene glycol, hydrolyzed starch, pregelatinized starch and combinations thereof.

17. The method for making metallic nickel or cobalt according to claim 14, wherein the binder is present in an amount ranging from about 2% to about 10% by weight.

18. The method for making metallic nickel or cobalt according to claim 14 wherein the dried agglomerates are reduced by a gaseous reductant.

19. The method for making metallic nickel or cobalt according to claim 14 wherein the dried agglomerates are reduced by coke or charcoal.

20. The method for making metallic nickel or cobalt according to claim 14, further comprising adding flux to the metal; melting or smelting; and separating slag from the metal.

21. The method for making metallic nickel or cobalt according to claim 14, wherein the agglomerates are dried at a temperature ranging from about 90° C. to about 110° C.

22. The method for making metallic nickel or cobalt according to claim 14, wherein the agglomerates are selected from the group consisting of pellets, briquettes, granules and extrudates.

23. The method for making metallic nickel or cobalt according to claim 14, further comprising at least partially drying the metal salt prior to blending the metal salt with the inorganic binder.

24. The method for making metallic nickel or cobalt according to claim 14, wherein the agglomerates are dried and reduced in one vessel.

25. A method for making metallic nickel or cobalt comprising
providing a metal salt selected from the group consisting of nickel hydroxide, cobalt hydroxide, mixed nickel-cobalt hydroxide, nickel carbonate, cobalt carbonate and combinations thereof;
mixing the metal salt with a binder selected from the group consisting of inorganic binder, organic binder and combinations thereof;
mixing the metal salt and binder with coke particles to form a mixture;
optionally adding water;
forming the mixture into agglomerates;
drying the agglomerates,
adding an effective reducing amount of coke and/or coal to the dried agglomerates, and
directly reducing the dried agglomerates with an effective amount of heat to produce a metal selected from the group consisting of nickel, cobalt and combinations thereof.

26. The method for making metallic nickel or cobalt according to claim 15 wherein the inorganic binder is selected from the group consisting of bentonite, quicklime, sodium silicate and combinations thereof.

27. The method for making metallic nickel or cobalt according to claim 15 wherein the organic binder is selected from the group consisting of lignin, guar gum, molasses, sugar, carboxymethylcellulose, cellulose, glycerol triacetate, polyethylene glycol, hydrolyzed starch, pregelatinized starch and combinations thereof.

28. The method for making metallic nickel or cobalt according to claim 15, wherein the binder is present in an amount ranging from about 2% to about 10% by weight.

29. The method for making metallic nickel or cobalt according to claim 15 further comprising subjecting the dried agglomerates to a gaseous reductant.

30. The method for making metallic nickel or cobalt according to claim 15, further comprising adding flux to the metal; melting or smelting; and separating slag from the metal.

31. The method for making metallic nickel or cobalt according to claim 15, wherein the agglomerates are dried at a temperature ranging from about 90° C. to about 110° C.

32. The method for making metallic nickel or cobalt according to claim 15, wherein the agglomerates are selected from the group consisting of pellets, briquettes, granules and extrudates.

33. The method for making metallic nickel or cobalt according to claim 25, further comprising at least partially drying the metal salt prior to blending the metal salt with the inorganic binder.

34. The method for making metallic nickel or cobalt according to claim 25, wherein the agglomerates are dried and reduced in one vessel.

* * * * *